March 24, 1970 A. C. BARBER ET AL 3,502,789

SUPERCONDUCTOR CABLE

Filed Nov. 27, 1967

United States Patent Office 3,502,789
Patented Mar. 24, 1970

3,502,789
SUPERCONDUCTOR CABLE

Anthony Clifford Barber, Lichfield, and Robert William Kelcher, Sutton, England, assignors to Imperial Metal Industries (Kynoch) Limited, Birmingham, England, a corporation of Great Britain Filed Nov. 27, 1967, Ser. No. 685,844
Claims priority, application Great Britain, Dec. 2, 1966, 54,134/66
Int. Cl. H01b 7/34, 5/00
U.S. Cl. 174—128 10 Claims

ABSTRACT OF THE DISCLOSURE

A composite superconductor comprising at least one filament of superconductor material, a first non-superconductor material of high electrical and thermal conductivities, and at least one filament of a second non-superconductor material of better specific mechanical strength than that of the first non-superconductor material.

BACKGROUND OF THE INVENTION

This invention relates to superconductors of the kind comprising superconductor constituents and stabilising non-superconductor constituents; this kind of superconductor is generally known as a composite superconductor and will be referred to as such in this specification.

Composite superconductors generally comprise a core in the form of a filament, wire, ribbon or layer of superconductor material which is sheathed by a non-superconductor stabilising material of good thermal and electrical conductivities, such as high conductivity copper or aluminium as examples. However, when such a composite superconductor is used for the windings of a superconductor magnet, the mechanical forces built up in the windings when high magnetic fields are produced are such that the windings tend to move apart and then break and so fail.

Consideration has been given to the expedient of strengthening the windings of the superconductor magnet by high-strength sheets between layers of the windings. However, this expedient substantially increases the cost of winding the magnet (as well as creating difficulties in the mode of winding), increases the size and weight of the windings with attendant complications to mounting and housing the windings and to the cryogenic requirements, and significantly reduces the thermal conductivities of the windings. Also there may well be inadequate strengthening when the composite superconductor is of a tubular nature.

Accordingly it is an object of the invention to produce a satisfactory method of strengthening composite superconductors to minimise the possibility of failure of superconductor magnet windings.

Summary of the invention

In accordance with the invention a composite superconductor comprises at least one filament, wire, ribbon or layer of superconductor material at least partially surrounded by and in good thermal and electrical connection with a first non-superconductor material of high electrical and thermal conductivities, and at least one filament, wire, ribbon or layer of a second non-superconductor material of better specific mechanical strength than that of the first non-superconductor material and mechanically connected to the superconductor material.

If the second non-superconductor material has good electrical and thermal conductivities, it is preferably in direct contact with and may completely surround the or each filament, wire, ribbon or layer of superconductor material. In this way the forces acting on the superconductor material have the immediate reaction of this relatively high strength material. However, the high thermal and electrical conductivities of the first non-superconductor material can be utilised to better effect by the latter surrounding and directly contacting the or each filament, wire, ribbon or layer of superconductor material, and then being surrounded by a sheath of the second non-superconductor material.

If the second non-superconductor material does not have good electrical and thermal conductivities, it must be spaced away from, and mechanically connected to, the superconductor material by the first non-superconductor material.

Preferably the second non-superconductor material is a strong copper alloy, whereby it may have good thermal and electrical conductivities, or stainless steel, e.g. Fe 18 wt. percent Ni 8 wt. percent Cr. If a copper alloy is used, copper-beryllium or copper-zirconium alloys may well be applicable.

In accordance with the invention also a method of manufacturing a composite superconductor comprises forming an assembly of elements of ductile superconductor material, a first ductile non-superconductor material of high electrical and thermal conductivities, and a second ductile non-superconductor material of better specific mechanical strength than that of the first non-superconductor material, and deforming, for example by extruding or drawing or both, the assembly to reduce its cross-sectional dimensions and to bond the elements of the assembly together.

Extruding or drawing may be carried out in two stages of which the first is at elevated temperatures of up to about 500° C. primarily intended to effect bonding of the constituents together, and of which the second is at lower temperatures to produce further reduction in the cross-sectional dimensions of the assembly and to impart beneficial cold-working effects to the superconductor properties of the superconductor material and to the mechanical properties of the non-superconductor materials.

Brief description of the drawings

Typical examples of the invention will now be more particularly described with reference to the accompanying diagrammatic drawings in which.

The same reference letters are used throughout the drawings, S denoting superconductor material, C denoting stabilising material, Z denoting strengthening material, and T denoting solder.

Description of the typical example

Figures 1, 2:
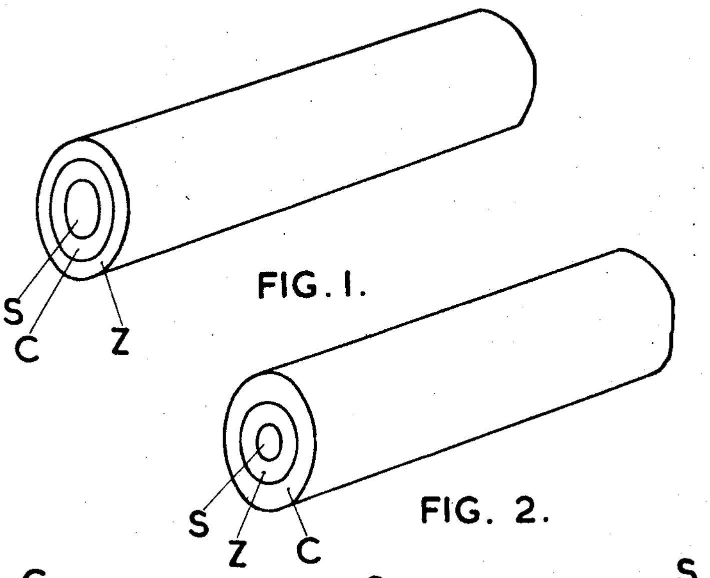
FIGURES 1 and 2 are sectioned lengths of superconductor composites.

FIGURE 1 shows a typical example of the invention in which a composite superconductor wire having a single core of superconductor material S is produced by placing a niobium 44 wt. percent titanium superconductor rod in a can of high conductivity copper, and the can is placed within a sheath of a copper 0.15 wt. percent zirconium alloy. The assembly so formed is extruded at from ambient temperatures to 500° C. to effect reduction in the cross-sectional dimensions of the assembly, and to bond the superconductor to the copper and the copper to the copper-zirconium alloy. Drawing can be used instead of extrusion. Further reduction in cross-sectional dimensions is carried out by drawing at ambient temperature, to provide the beneficial cold-working effects on the superconductor properties of the superconductor alloy, and to strengthen by cold-working the mechanical strengths of the copper and the copper alloy. This results in the composite shown in FIGURE 1 in which the superconductor S is provided with a stabilising sheath of copper C, and strengthening is provided by a layer of the copper-zirconium alloy Z.

The manufactured superconductor wire is then aged in the region of 300° C. to 450° C. preferably at about 400° C., for a period of time in the range of 15 minutes to 4 hours, preferably about 1 hour, in order to improve the superconducting properties of the niobium-titanium, probably by refining of the dislocation structure produced by cold-working, and to improve the conductivity of the copper-zirconium alloy. The ageing may also further improve the strength of the copper-zirconium alloy.

In a first modification of the typical example, because the copper-zirconium alloy has good thermal and electrical conductivities, although they are not of the same order as that of the pure copper, the layers of copper and copper alloy are reversed. This is shown in FIGURE 2 in which the copper-zirconium alloy Z forms a layer encircling and in contact with the superconductor core S, and is surrounded by the copper C.

Figure 3:
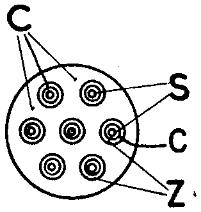
FIGURES 3 to 9 are cross-sectional views in whole or in part of superconductor composites either completely or partly manufactured.

In a further modification, the superconductor wire manufactured in accordance with the example and as shown in FIGURE 1 is cut into lengths which are packed into a sheath of copper and this is followed by extrusion and drawing to reduce the cross-sectional dimensions to those of the order of those of the wire. In this way a multiple core composite is produced in which every core of superconductor material is provided with its own reinforcement. This is shown in FIGURE 3. The same ageing treatment is then used.

Figure 4:
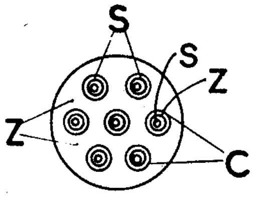

Alternatively the composite of FIGURE 2 can be treated in the same way, a sheath of the copper-zirconium alloy being used. FIGURE 4 shows the result in which each superconductor filament S is provided with a stabilising sheath C, the sheath C lying in a matrix of the strong alloy Z.

Figure 5:
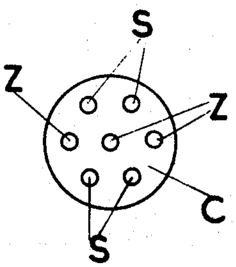
Figure 6:
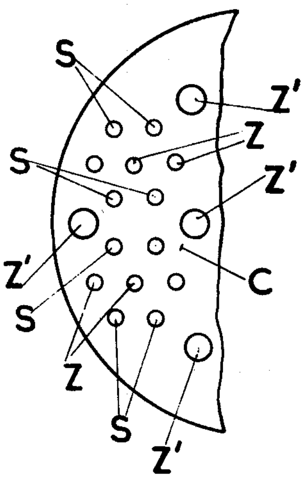

In a further modification, a superconductor wire having a single core of superconductor material sheathed in copper only is cut into lengths and is packed into a copper sheath together with a plurality of wires of the reinforcement alloy. The assembly so formed is again extruded and drawn to the desired dimensions as shown in FIGURE 5. The composite of FIGURE 5 can be cut into lengths and repacked in a further sheath, perhaps with further strengthening wires, for extrusion and drawing as required. In this way the final composite has a large number of strengthening wires or filaments rather than layers of the strengthening alloy. This is shown in FIGURE 6 which shows part of a cross-sectional view, the extra reinforcing wires being denoted Z'.

In still further modifications aluminum can be used instead of copper for the non-superconductor material of high electrical and thermal conductivities, and other strengthening alloys such as stainless steel and beryllium-copper can be used in place of or in addition to the copper-zirconium alloy. A suitable copper-beryllium alloy is Cu 3 wt. percent Be.

In a further typical example of the invention a multi-cored composite is produced in which copper sheaths reinforcing wires of stainless steel Fe 18 wt. percent Ni 8 wt. percent Cr. This can be done in one step by packing a copper can with stainless steel rods and copper rods, followed by extrusion or drawing, or by the location of a bar of stainless steel in the can of copper, extrusion and/or drawing to produce a single-cored composite wire, followed by the packing of a number of lengths of this wire in a further can of copper and extrusion and/or drawing.

Figure 7:
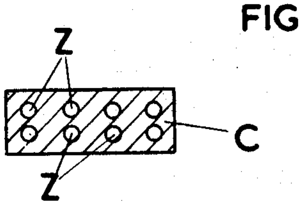

The product of the above operations is shown in FIGURE 7 and is then provided with a final rolling operation to produce a strip in which the upper and lower surfaces have a number of longitudinally-extending grooves. This copper strip is then provided with a full annealing heat-treatment, typically in the range 250° C.–650° C., in order to give the copper its best conductivity properties. The actual temperatures selected will depend upon, amongst other factors, the composition of the stainless steel, because it is undesirable for constituent elements of the stainless steel to diffuse into the copper to any large extent.

This strip is then passed through a hot tin bath to provide it with a layer of tin, and is then provided with a number of superconductor wires which are themselevs sheathed with copper. This can be done by unreeling a length of a single-cored composite of superconductor and copper into each tinned groove as it passes between a light pair of rollers which serve merely to press the superconductor composite wires into the tin.

Figure 8:
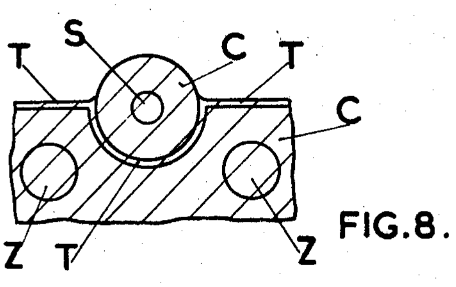

The composite thus produced is then passed through a soldering furnace, for example operating it between 250° C.–400° C., to melt the tin and solder the single-cored composite superconductor wires onto the reinforced copper strip. Thus there is produced a superconducting composite in which the copper is fully annealed to provide it with its best thermal and electrical conductivity properties, and it is adequately reinforced by the stainless steel filaments. FIGURE 8 shows part of a cross-sectional view of the completed superconductor composite, from which it can be seen that the solder T holds each superconductor wire plus sheath in a groove in the strengthened strip.

Figure 9:
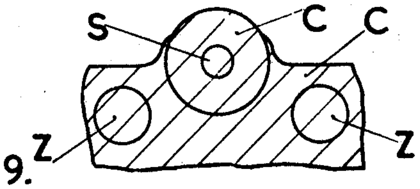

In modifications of this further example, the stainless steel reinforcement can be replaced by or partially substituted by other reinforcing filaments, for example by a strong copper alloy or other strong titanium alloy. Suitable titanium alloys are Ti 15 wt. percent Mo and Ti 3 wt. percent Cu. Furthermore other solders can be used in place of tin, for example indium which has a good electrical and thermal conductivity but which is expensive, or tin-lead soldering alloys. It may be adequate to omit a soldering operation, the walls of the grooves being mechanically deformed to fully overlap and press tightly against the single-cored superconductor composite, provided that adequate electrical and thermal contact can be made between the copper strip and the superconductor composite. This is shown in FIGURE 9.

In yet another modification of this further example, the multi-cored composite of copper and stainless steel can be manufactured by casting the copper around an array of stainless steel rods, followed by extrusion and/or drawing together with superconductor filaments.

We claim:

1. A composite superconductor comprising:

(a) at least one filament of the alloy niobium 44 wt. percent titanium, (b) a first material which is not superconductive at the boiling point of liquid helium, has high electrical and thermal conductivities, and at least partially surrounds and is in good thermal and electrical connection with said filament, (c) and at least one filament of a second material which is not superconductive at the boiling point of liquid helium, has a higher specific mechanical strength than said first material and is mechanically connected to said niobium-titanium filament, said second material having good electrical and thermal conductivities and being in direct contact with the alloy niobium 44 wt. percent titanium.

2. A composite superconductor comprising:

(a) at least one filament of the alloy niobium 44 wt. percent titanium, (b) a first material which is not superconductive at the boiling point of liquid helium, has high electrical and thermal conductivities, and at least partially surrounds and is in good thermal and electrical connection with said filament, (c) and at least one filament of a second material which is not superconductive at the boiling point of liquid helium, has a higher specific mechanical strength than said first material and is mechanically connected to said niobium-titanium filament, said second material being selected from the group consisting of a strong copper alloy, stainless steel, and a strong titanium alloy.

3. A composite superconductor according to claim 2 wherein the strong copper alloy is selected from the group consisting of copper-zirconium and copper-beryllium alloys.

4. A composite superconductor according to claim 2 wherein the strong titanium alloy is selected from the group consisting of titanium 15 wt. percent molybdenum and titanium 3 wt. percent copper alloys.

5. A composite superconductor comprising:

(a) at least one filament of a superconductor material which is superconductive at the boiling point of liquid helium, (b) a first material which is not superconductive at the boiling point of liquid helium, has high electrical and thermal conductivities, and at least partially surrounds and is in good thermal and electrical connection with said filament, (c) and at least one filament of a second material which is not superconductive at the boiling point of liquid helium, has a higher specific mechanical strength than said first material, has good thermal and electrical conductivities, and surrounds and is bonded to said superconductor filament, said second material being surrounded by and bonded to said first material.

6. A composite superconductor according to claim 5 wherein the first material is selected from the group consisting of high conductivity copper and aluminium.

7. A composite superconductor according to claim 5 wherein the second material is selected from the group consisting of a strong copper alloy, stainless steel, and a strong titanium alloy.

8. A composite superconductor according to claim 7 wherein the strong copper alloy is selected from the group consisting of copper-zirconium and copper-beryllium alloys.

9. A composite superconductor according to claim 7 wherein the strong titanium alloy is selected from the group consisting of titanium 15 wt. percent molybdenum and titanium 3 wt. percent copper alloys.

10. A composite superconductor according to claim 5 comprising a plurality of filaments of the superconductor material, each filament being surrounded by and bonded to a corresponding layer of the second material, the superconductor filaments with the corresponding layers of the second material being bonded in a matrix of the first material.

References Cited

UNITED STATES PATENTS

| | | | |
|---|---|---|---|
| 294,545 | 3/1884 | Waring | 174—104 |
| 867,659 | 10/1907 | Hoopes | 174—128 X |
| 3,306,972 | 2/1967 | Laverick. | |
| 3,372,470 | 3/1968 | Bindari. | |
| 3,366,728 | 1/1968 | Garwin. | |
| 3,281,736 | 10/1966 | Kunzler | 335—216 |

E. A. GOLDBERG, Primary Examiner

U.S. Cl. X.R.

174—15, 126; 335—216